United States Patent [19]
Goldfarb

[11] Patent Number: 5,333,868
[45] Date of Patent: Aug. 2, 1994

[54] METHOD OF PLAYING A GAME OF CHANCE AT LOCATIONS REMOTE FROM THE GAME SITE

[76] Inventor: Simon Goldfarb, 525 S. Ardmore St. #254, Los Angeles, Calif. 90020

[21] Appl. No.: 24,361

[22] Filed: Mar. 1, 1993

[51] Int. Cl.⁵ ............................................. A63F 3/06
[52] U.S. Cl. .................................. 273/138 A; 273/439
[58] Field of Search .................... 273/439, 138.A, 269

[56] References Cited

U.S. PATENT DOCUMENTS

| | | | |
|---|---|---|---|
| 4,922,522 | 5/1990 | Scanlon | 273/138 A |
| 4,969,183 | 11/1990 | Reese | 273/138 A |
| 5,018,736 | 5/1991 | Pearson et al. | 273/439 |
| 5,157,602 | 10/1992 | Fields et al. | 273/144 B |

Primary Examiner—Benjamin H. Layno
Attorney, Agent, or Firm—Erik M. Arnhem

[57] ABSTRACT

Participating in a game of chance, such as KENO, played remotely away from the site where the winning numbers are drawn. Each player can mark his predicted winning number combination on a sheet that is inserted into a facsimile machine remote from the game site; simultaneously and automatically charging the cost of playing participation to the player's credit card number. Information is transmitted over the phone line to a second facsimile machine at the game site, where the information may be computerized and compared with the winning numbers drawn by the game operators. The number-drawing process may be televised, such that players located remote from the game site will learn immediately whether or not they have become winners.

5 Claims, 1 Drawing Sheet

METHOD OF PLAYING A GAME OF CHANCE AT LOCATIONS REMOTE FROM THE GAME SITE

BACKGROUND AND SUMMARY OF THE INVENTION

Many persons enjoy playing games of chance, such as KENO, BINGO, and the lottery. However, in some cases a person may not be able to play the game because of transportation problems or for other reasons. Thus, the person may not be physically able to drive a car to the site of a game or to a store where lottery tickets are sold.

The present invention concerns a method of playing a game of chance, such as KENO, BINGO or the lottery, without having to be physically present at the game site, or without having to travel to a store or other location where lottery tickets are sold.

The method of the present invention involves the use of phone-operated facsimile machines for transmitting game information from each game player to the physical site where the game is being played, i.e. the place where the KENO, or BINGO numbers are drawn, or the winning lottery numbers selected. Subsequent to having inserted a game sheet into the facsimile machine, at e.g. his/her residence, a hotel room or a restaurant, containing a predicted winning combination, and other vital information, the game player also provides simultaneously therewith his/her credit card number, date of expiration and other data as required by the credit card issuer and/or the game site management. In doing so, the game player ensures that the amount of money that he/she is playing for is promptly charged to the supplied credit number. These charge of charges will then be billed to the game player in due course. The game site establishment's bank account will be credited with the cost incurred by the game player. Information on the game sheet is transmitted over the telephone line to a receiving fax machine located at the game site, e.g. the KENO or BINGO hall or the main lottery headquarters. An electronic reader device at the game site will read the duplicate game sheet generated by the receiving fax machine, and electronically transmits the information on the sheet to a computer memory and return a receipt confirmation to the game player with date and hour received, and further information as to approximately time of playing and number of the game, personal identification number, etc. The information received by the game operator is stored in the computer memory pending the time when the game is to be played or the winning lottery number drawn. At the designated time the winning numbers are punched into the computer and electronically compared with the numbers in the computer memory to select a game winner (or lottery winner).

The game player's credit card number is processed in a conventional manner or by special arrangement with the bank issuer of the card, in order to credit the game site's bank account.

The principal advantages of the invention are that each game player can play the game without having to physically travel to the game site or to a lottery sales outlet and can automatically charge the amount played for to his/her credit card. Senior citizens, confined to their residences, would especially enjoy the benefits of this invention.

THE DRAWINGS

DESCRIPTION OF A PREFERRED EMBODIMENT OF THE INVENTION

Figures 1, 2:
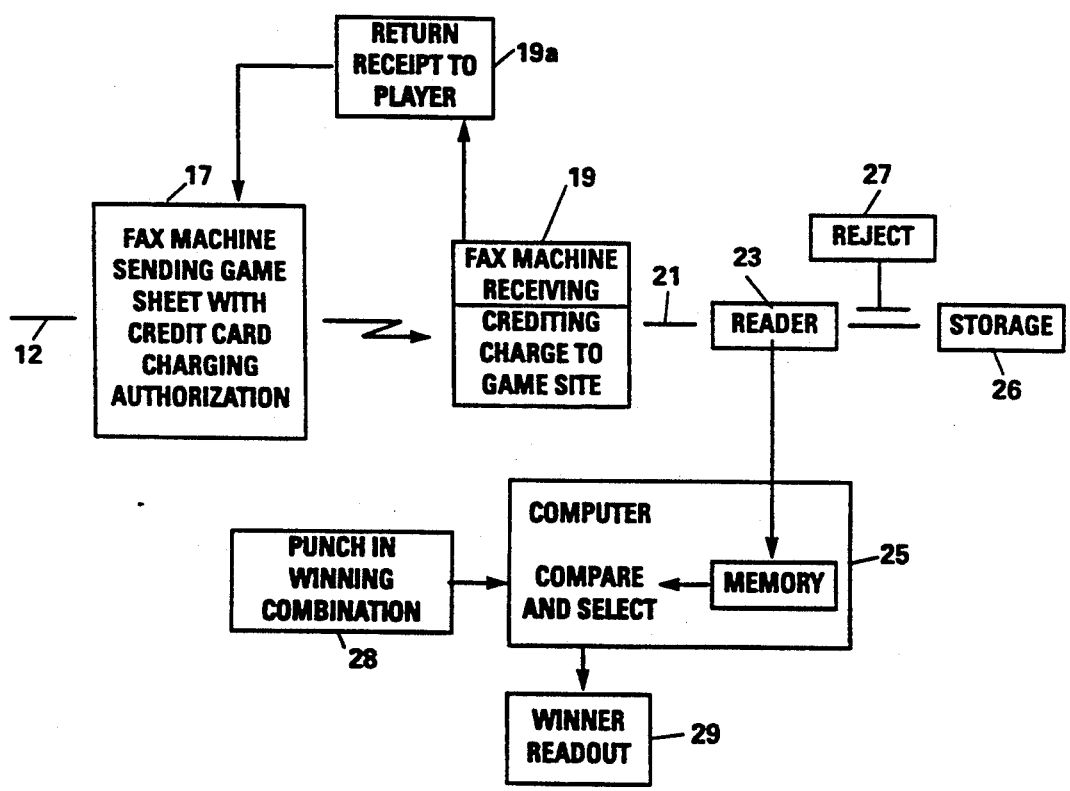
FIG. 1 is a plan view of a game sheet that can be used in playing the game e.g. of KENO, according to the present invention.
FIG. 2 is a flow diagram showing how information is transmitted and simultaneously paid for as utilized during the playing of the game of KENO with the method of the present invention.

FIG. 1 shows a sheet of paper 10 having marked spaces thereon for placement of information by a person desiring to play the game of KENO without physically travelling to the hall or similar location where the game is being conducted. Sheet 10 is designed for insertion into a conventional phone-operated facsimile machine (hereinafter fax machine) accessible to each person desiring to play the game remote from the game site. In order for the game player to pay for the cost of the game participation, the game sheet is provided with a separate space where the game player can place his/her signature, write in his credit card number, name of card issuer, expiration date of card and other information. The dollar amount, thus selected by the game player will be charged to the game player's credit card account, (as recorded on the game sheet) and credited to the game site's management. As noted above a detailed confirmation receipt will promptly be returned by the game operator by fax or otherwise to the game player. The system that is handling the automatic charging of the dollar amount to the game player's credit card number could also be linked to a privately used computer system, ensuring automatic transfer of the game player's credit card number to the card issuer so that the game site's account can be credited with the amount played for. Depending on the magnitude of the geographical area involved, such fax machines (and game players) could be located at any game site within one city or state, or several states. Alternately the players could be in any room, in a single hotel, or various rooms in a chain of hotels or restaurants.

It is also possible that the game site management may issue its own credit cards to facilitate transfer of funds from game participants.

A game player's account number may also be established prior to the playing of any particular game. It is contemplated that persons desiring to play e.g. KENO (or other games of chance such as e.g. lottery) will apply to the game site establishment for an account number. The establishment will issue the person an account number that entitles the person to use the number for playing the game on a remote-play basis. If the game player does not have a credit card the game could also be played on a "credit" basis, i.e. by the person putting sufficient funds into his account to cover his game expenses.

As shown in FIG. 1, the game sheet 10 includes a number of spaces, designated 12b for insertion of the game player's name, signature, game number, date and time of playing, confirmation number, etc. Space 12a is subdivided into eight vertical columns; said columns being subdivided into ten horizontal rows. The player will mark the appropriate squares with a pencil or pen to indicate his particular winning combination in a form that can be read by a reader machine located at the game site.

FIG. 2 shows generally how the game sheet of FIG. 1 is used during the playing e.g. of a KENO game. The player inserts game sheet 10 into a conventional fax machine 17, whereby the information on the sheet is transmitted over the phone line to another fax machine 19 located at the game establishment. The cost of the game participation being charged preferably and automatically to the game person's credit card (17) as explained in detailed above. A facsimile (replica) sheet 21 is generated having the same information as sheet 12; a receipt 19a, confirming the date/hour received by the operator, including game session number, the amount chosen by the game player, etc. is promptly returned to the game player. Sheet 21 is passed through an electronic reader device 23, which reads and electronically collects the information contained in the spaces at 12a and 12b on sheet 12.

The information is electronically transmitted from reader device 23 to a MEMORY in computer 25. Meanwhile sheet 21 is fed from the reader device to storage 26 for later reference use, if necessary.

In some cases the game sheet 10 may have been filled out incorrectly, or without proper authorization, e.g. the account number may be overdrawn or otherwise not correct. A rejection mechanism 27 may be controlled by the reader device 23 to detour the affected sheet 21 away from storage 26. A human technician can examine the detoured sheet and phone the player to advice him of the situation.

During the playing e.g. of a game of KENO, in which numbers printed on pellets taken from a KENO goose are transmitted or announced to the player, such numbers are punched into a keyboard 28 operatively connected to the associated computer 25. In the computer the selected numbers are compared with the predicted numbers previously put into the computer memory by reader device 23. When the computer finds a match between the punched-in numbers and a particular set of numbers predicted by one or more players, the computer will generate a winner feed-out sheet 29.

Players of KENO or BINGO games usually want to know as quickly as possible when they have become a winner; part of the game interest is the excitement of being declared a winner. In the remote playing of such games, as hereinabove described, the ceremony (or event) of drawing the winning numbers is preferably televised, either over a local television station or in a closed-circuit television system (e.g. to all the rooms in a hotel or a group of hotels). The remotely located players can view the T.V. picture, and observe their names being announced as winners.

The computer is preferably selected or sized so that computer operations involved in determining the winners are fast enough to keep pace with the process of drawing the winning numbers. In cases where there are large number of game players a plurality of computers may be connected to a single number punch-in keyboard, such that the various computers are in their computing modes at the same time.

The game sheet 10 filled out by the player can be reused for several games (by storage of the information in the computer memory). A player can fill out any number of sheets 10 applicable to any given game session.

The description has proceeded, generally on the basis of a KENO game. However, it will be appreciated that the invention could be practiced with other games of chance, e.g. the lottery, etc.

What is claimed is:

1. A method of participation in playing a game of chance prediction of a winning combination, wherein the game players are in various locations remote from the game site, said method comprising the steps of:
    a. a game player manually completing a game sheet so that the sheet includes, in machine readable form, at least the game player's identity, credit card number, and predicted winning combination,
    b. the game player inserting the completed game sheet into a facsimile phone machine at a location remote from the game site, whereby the game sheet information is transmitted over the phone line to the game site;
    c. the game site operator removing a facsimile of the game sheet from a receiving facsimile phone machine located at the game site;
    d. the game site operator charging the cost of the game participation to the game player's credit card number;
    e. the game site operator transmitting a written receipt from the game site to the game player, confirming the details of the player's participation in the game;
    f. the game site operator sending the facsimile of the game sheet through an electronic reader at the game site;
    g. transmitting the reader electronic output to a computer memory at the game site; and
    h. comparing the game winning combination with player combinations stored in the computer to select the player having the winning combination.

2. The method of claim 1, and further comprising the step of:
    i. televising the ceremony of drawing the winning combination, so that the game player is immediately aware of the winning combination.

3. The method of claim 2, and further comprising the step of:
    j. passing the facsimile of the game sheet from the electronic reader through a rejection mechanism for detection of errors on the game sheet that would make the game player ineligible to become a winner.

4. The method of claim 3, and further comprising the step of:
    k. a human technician at the game site phoning the game player the reasons for the ineligibility discovered in step (j.).

5. The method of claim 4, wherein step (a) involves the player writing his signature on the game sheet.

* * * * *